(12) United States Patent
Akita et al.

(10) Patent No.: US 9,014,283 B2
(45) Date of Patent: Apr. 21, 2015

(54) COMMUNICATION SYSTEM

(71) Applicant: DENSO CORPORATION, Kariya, Aichi-pref. (JP)

(72) Inventors: Hironobu Akita, Okazaki (JP); Takahisa Yoshimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/058,714

(22) Filed: Oct. 21, 2013

(65) Prior Publication Data

US 2014/0126654 A1 May 8, 2014

(30) Foreign Application Priority Data

Nov. 5, 2012 (JP) ................................. 2012-243528

(51) Int. Cl.
*H04L 29/00* (2006.01)
*H04B 3/04* (2006.01)

(52) U.S. Cl.
CPC ........................................ *H04B 3/04* (2013.01)
USPC ........................................................ 375/257

(58) Field of Classification Search
CPC .............. H04B 1/38; H04B 3/02; H04B 3/04; H04B 3/06; H04B 3/30; H04L 25/02; H04L 25/026; H04L 25/0264; H04L 2025/02; H04L 2025/03; H04L 2025/03356
USPC ......... 375/133, 141, 219, 220, 222, 257, 259, 375/356, 367, 368; 370/282, 292; 455/39, 455/500, 70, 71, 73, 88
See application file for complete search history.

(56) References Cited

U.S. PATENT DOCUMENTS

| | | | |
|---|---|---|---|
| 4,750,138 A | 6/1988 | Schouhamer Immink | |
| 2005/0249300 A1* | 11/2005 | Jeong et al. | 375/265 |
| 2009/0202065 A1* | 8/2009 | Majima | 380/28 |
| 2010/0092185 A1 | 4/2010 | Nemoto | |
| 2012/0094687 A1* | 4/2012 | Choi et al. | 455/456.1 |

FOREIGN PATENT DOCUMENTS

| | | |
|---|---|---|
| JP | H01-269344 A | 10/1989 |
| JP | 2004-023647 A | 1/2004 |
| JP | 2008-177711 A | 7/2008 |

OTHER PUBLICATIONS

"Digital Modulation in Communications Systems—An Introduction", http://cp.literature.agilent.com/ litweb/pdf/5965-7160J.pdf (Jun. 2000).

(Continued)

*Primary Examiner* — Young T. Tse
(74) *Attorney, Agent, or Firm* — Posz Law Group, PLC

(57) ABSTRACT

An ECU of a transmission side performs a first conversion of converting a single bit of original baseband data into a four-bit bit pattern, which indicates one of two kinds of "0" and "1" of the single bit, to thereby prepare after-conversion baseband data, and transmits the after-conversion baseband data as transmission data to a transmission line. An ECU of a reception side restores the original baseband data by performing a second conversion of the received transmission data. The second conversion is the reverse of the first conversion. The ECU of the transmission side transmits the transmission data that includes a training pattern, which indicates a bit period of the transmission data, in addition to the after-conversion baseband data. The ECU of the reception side specifies the bit period of the transmission data based on the training pattern in the received transmission data.

14 Claims, 13 Drawing Sheets

(56) References Cited

OTHER PUBLICATIONS

"Architectures for Multi-Gigabit Wire-Linked Clock and Data Recovery", IEEE-Circuits and Systems Magazine, Fourth Quarter 2008, p. 45-57.

Office Action mailed Jul. 22, 2014 in the corresponding JP application No. 2012-243528 (wth English translation).
Office Action mailed Feb. 24, 2015 issued in corresponding JP patent application No. 2012-243528 (and English translation).

* cited by examiner

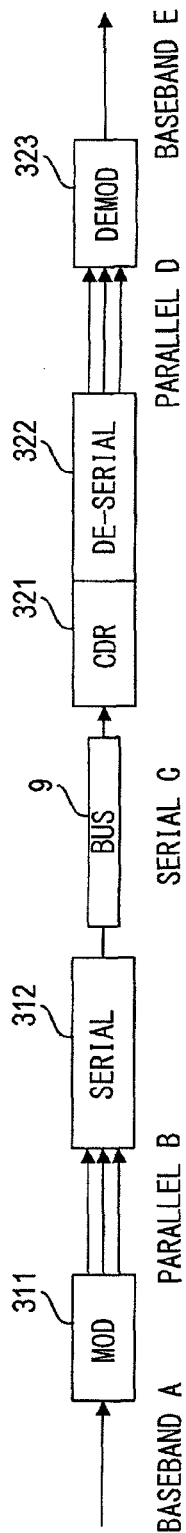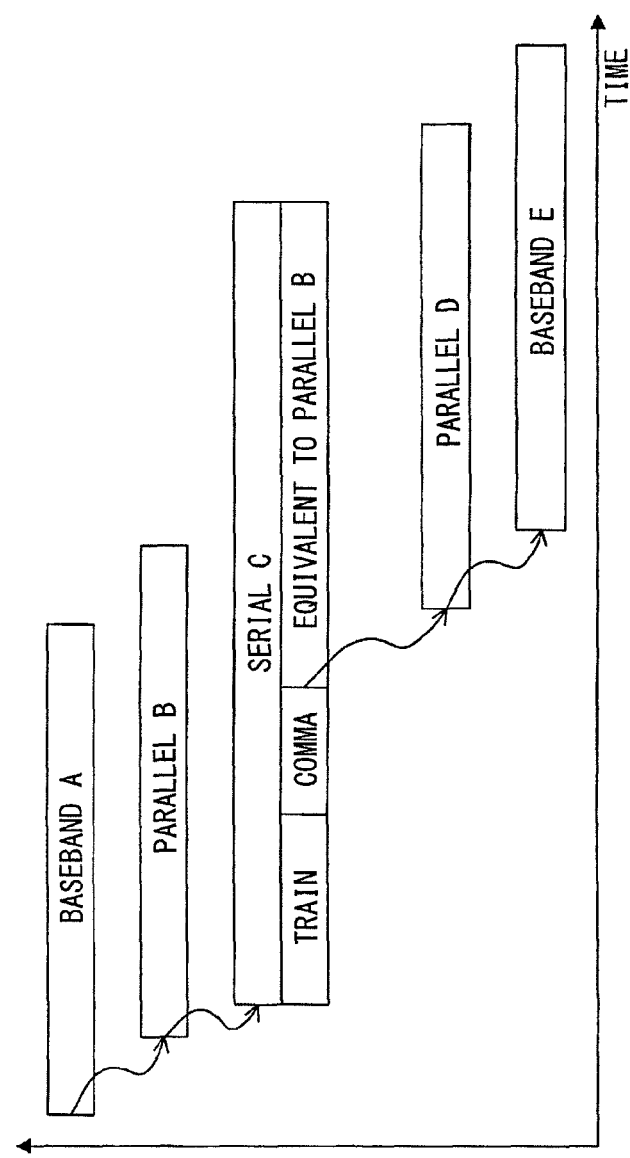
FIG. 2A
FIG. 2B

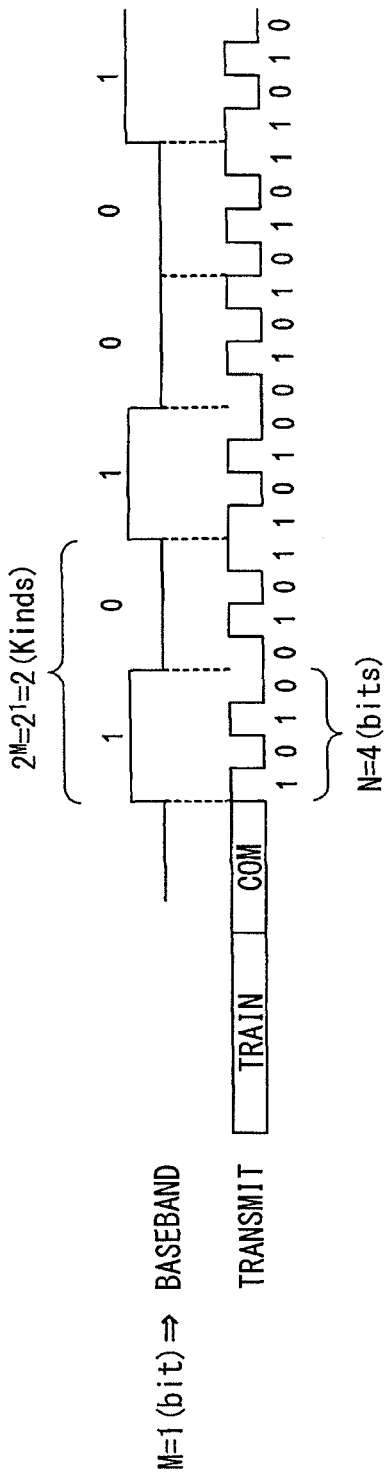
FIG. 3  [1st EM]
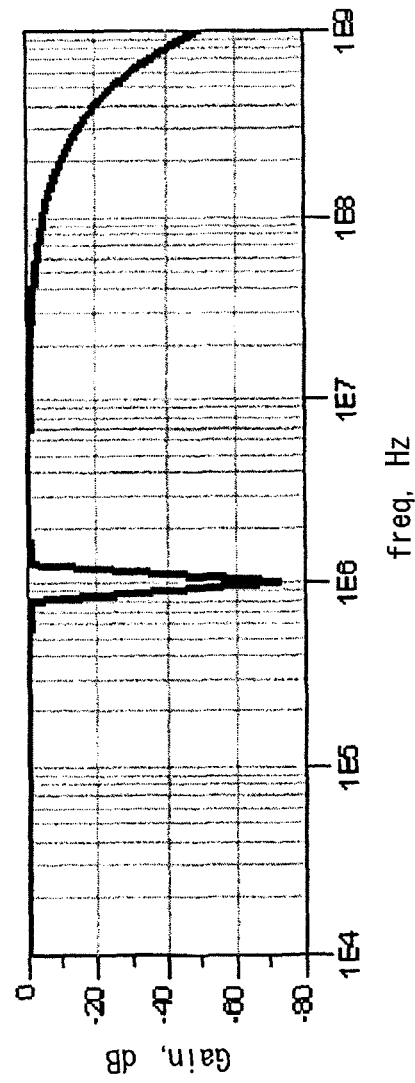
FIG. 4

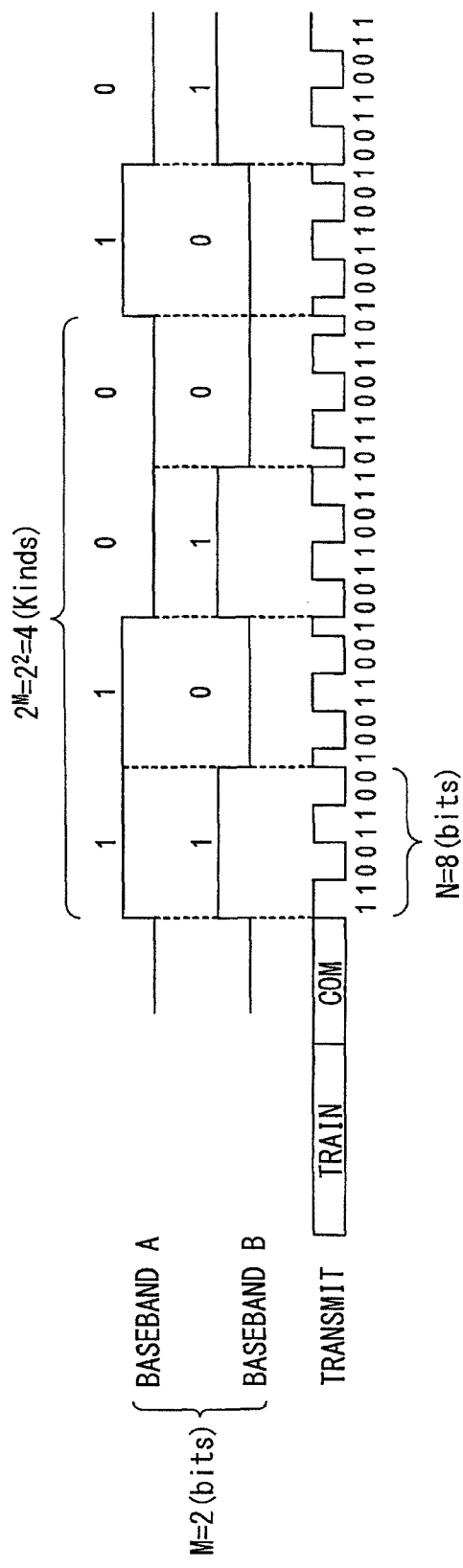

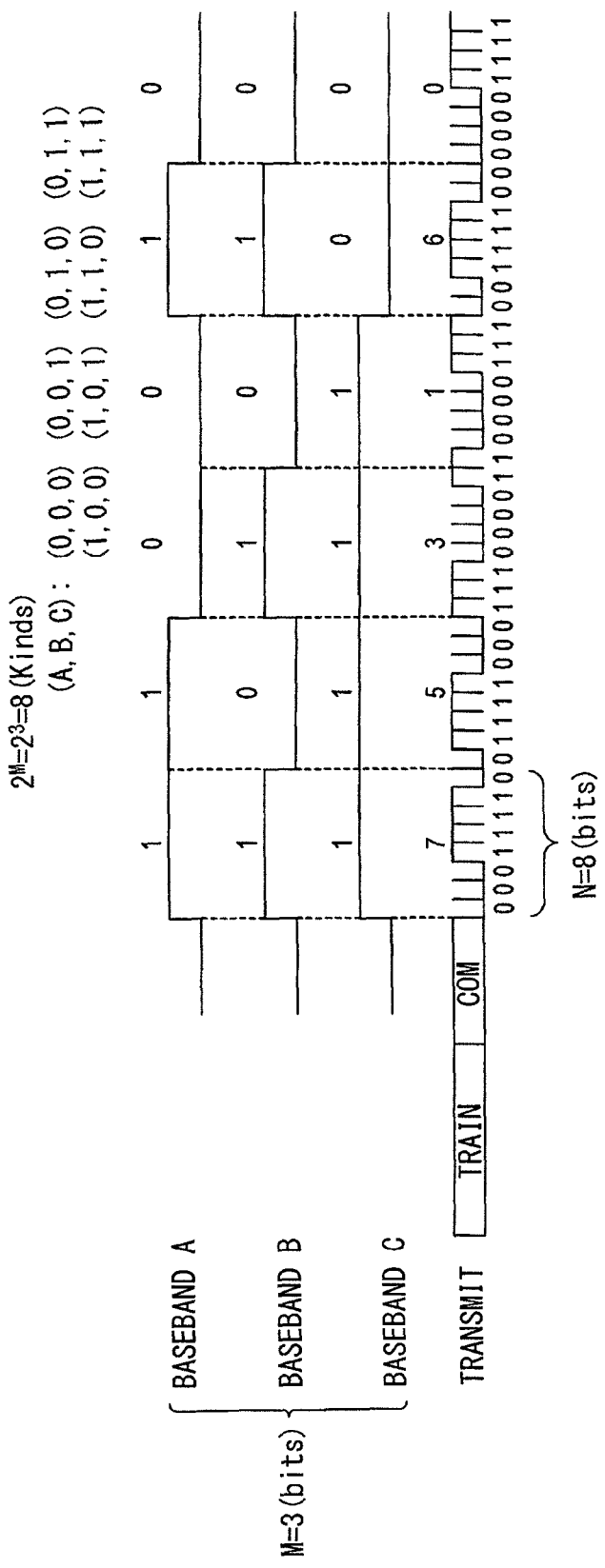

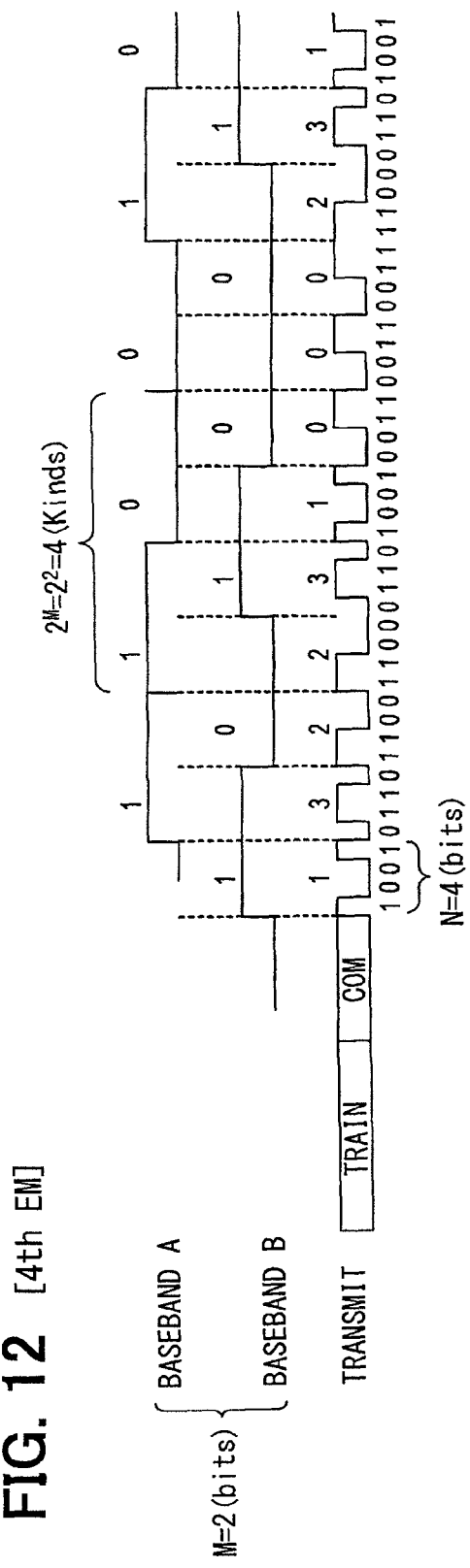
FIG. 12 [4th EM]
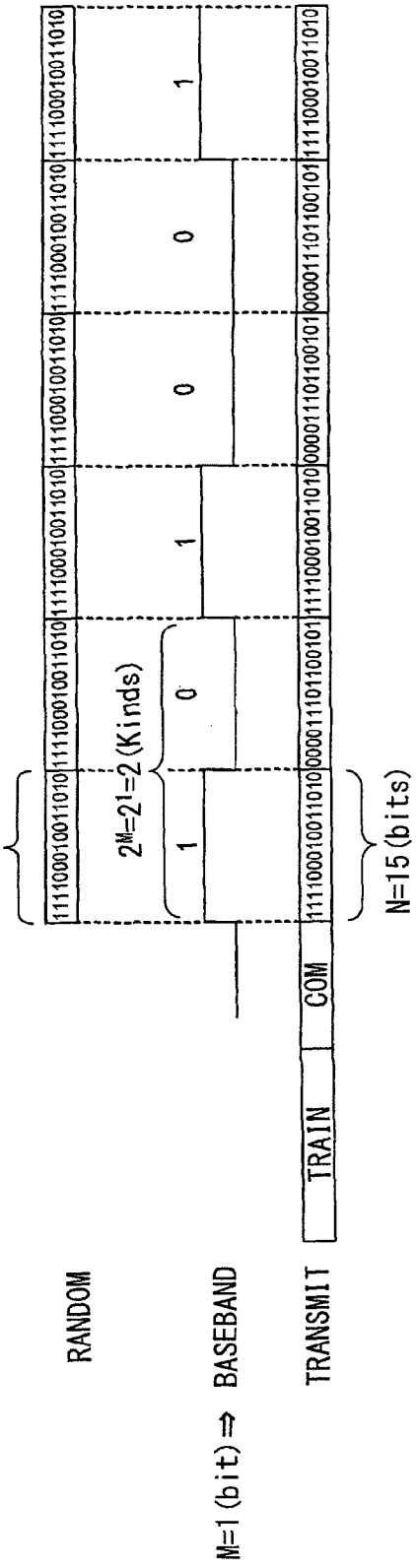
FIG. 13 [5th EM]

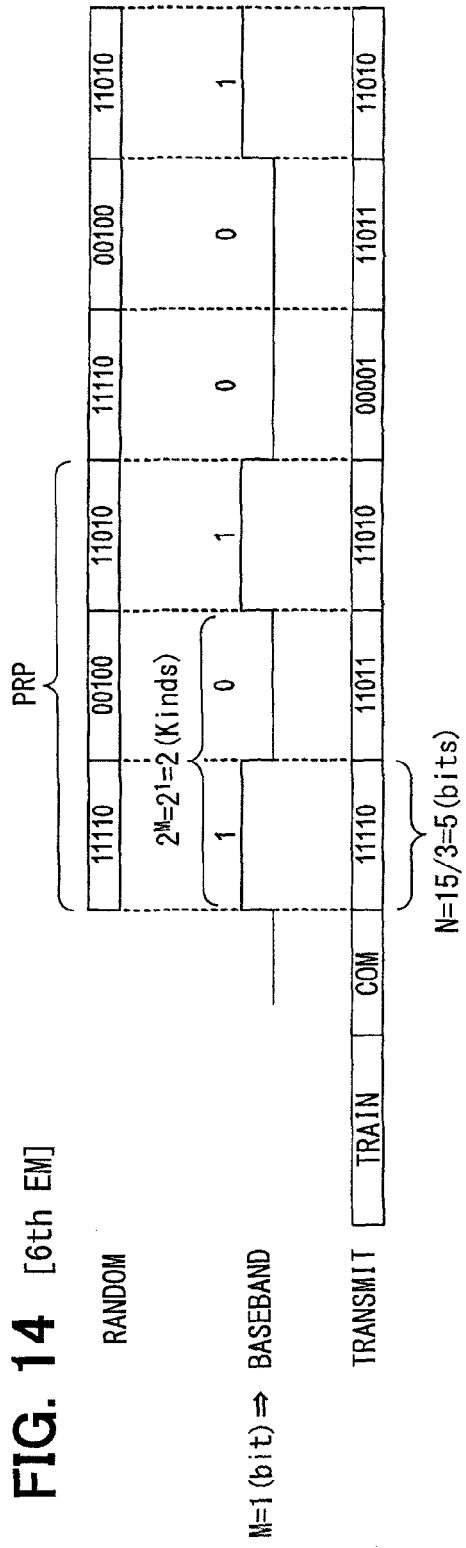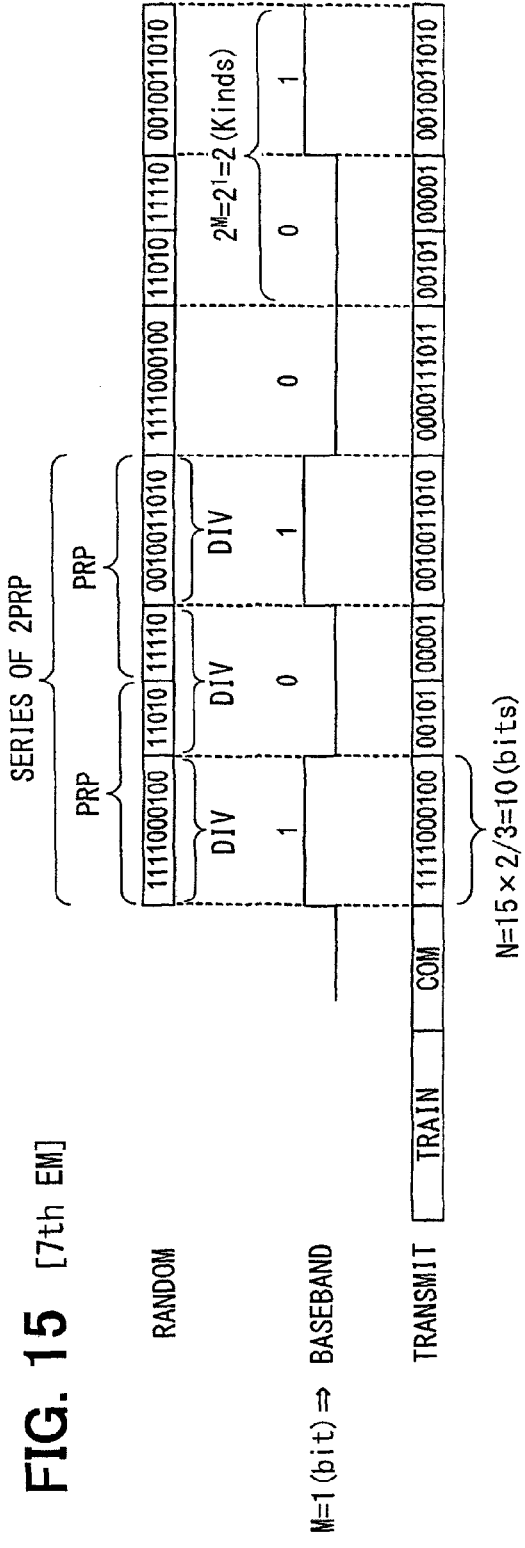

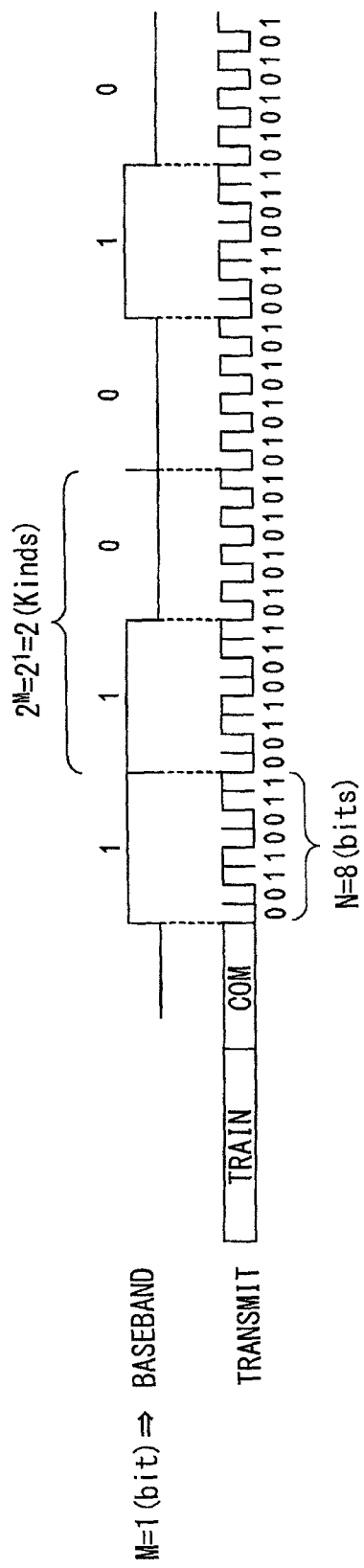
FIG. 16 [8th EM]

COMMUNICATION SYSTEM

CROSS REFERENCE TO RELATED APPLICATION

The present application is based on Japanese Patent Application No. 2012-243528 filed on Nov. 5, 2012, the disclosure of which is incorporated herein by reference.

TECHNICAL FIELD

The present disclosure relates to a communication technology to permit communication apparatuses to communicate via a common transmission line.

BACKGROUND ART

Nonpatent Literature 1:
http://cp.literature.agilent.com/litweb/pdf/5965-7160J.pdf An in-vehicle communication system is known which connects several devices using a single common wire harness (i.e., transmission line) in order to reduce the total weight of wire harnesses, without using conventional multiple wire harnesses. The communication system achieves the data transmission with proper timing to prevent the several devices from transmitting simultaneously, thereby permitting the use of a common transmission line and reducing the number of wire harnesses.

From another standpoint, such a communication system may undesirably have a specific frequency component. For example, input capacitances of devices or branching portions of the transmission line may pose variation in a characteristic impedance of the transmission line; the variation may cause a frequency characteristic to decrease a transmission power rapidly around a specific frequency. In addition, the increase of the specific frequency component may affect other devices such as an AM radio receiver not belonging to the communication system.

Further, Nonpatent Literature 1 discloses a configuration to perform a frequency conversion of digital data using an analog circuit such as a mixer, and transmit the data as radio waves.

However, the configuration in Nonpatent Literature 1 generally uses many analog circuits such as a mixer; this may pose difficulty in designing, increase the sizes of circuits, or reduce noise tolerance.

SUMMARY

It is an object to provide a technology to adjust a frequency component of transmission data with a comparatively simple configuration which need not use an analog circuit such as a mixer.

To achieve the above object, according to an aspect of the present disclosure, a communication system is provided to connect a plurality of communication apparatuses to communicate with each other via a common transmission line. The system includes a transmitter and a receiver. The transmitter performs a first conversion of converting every M bits of baseband data into modulation data. The modulation data is one kind of N-bit bit pattern among $2^M$ kinds of N-bit bit patterns according to a value of the every M bits. M is an integer equal to or greater than one, while N is greater than M and equal to or greater than three. $2^M$ is the M-th power of 2 (i.e., 2 to the M-th power). The transmitter then transmits the modulation data as transmission data to the transmission line. The receiver receives the transmission data via the transmission line, and restores the baseband data from the transmission data by performing a second conversion, that is the reverse of the first conversion. The transmitter transmits the transmission data that includes a training pattern, which indicates a bit period of the transmission data, in addition to data corresponding to the baseband data, the transmitter transmitting the data corresponding to the baseband data after the training pattern. The receiver specifies the bit period of the transmission data based on the training pattern.

Such a communication system permits the transmission data in the transmission line to have a bit rate higher than that of the baseband data; this can adjust a frequency component of the transmission data. Further, the transmission data is prepared by converting every M bits of baseband data into a bit pattern of N bits (i.e., N-bit bit pattern), the bit period of which can be specified based on a training pattern. Thus, the communication system can adjust a frequency component of transmission data with a comparatively simple configuration which need not use an analog circuit such as a mixer.

In addition, the present disclosure is realizable with various embodiments other than a communication system, such as a communication apparatus included in a communication system, a transceiver or control apparatus (e.g., microcomputer) in a communication apparatus, or a communication method executed in a communication system.

BRIEF DESCRIPTION OF THE DRAWINGS

The above and other objects, features, and advantages of the present disclosure will become more apparent from the following detailed description made with reference to the accompanying drawings. In the drawings:

FIG. 2A is a block diagram illustrating a communication flow;

FIG. 2B is a diagram illustrating schematically a time-based flow of data conversion;

FIG. 3 is a diagram illustrating a correspondence relation between baseband data and transmission data according to a first embodiment of the present disclosure;

FIG. 4 is a diagram illustrating an example of a frequency characteristic of a transmission line;

FIG. 10 is a diagram illustrating a correspondence relation between baseband data and transmission data according to a second embodiment of the present disclosure;

FIG. 11 is a diagram illustrating a correspondence relation between baseband data and transmission data according to a third embodiment of the present disclosure;

FIG. 12 is a diagram illustrating a correspondence relation between baseband data and transmission data according to a fourth embodiment of the present disclosure;

FIG. 13 is a diagram illustrating a correspondence relation between baseband data and transmission data according to a fifth embodiment of the present disclosure;

FIG. 14 is a diagram illustrating a correspondence relation between baseband data and transmission data according to a sixth embodiment of the present disclosure;

FIG. 15 is a diagram illustrating a correspondence relation between baseband data and transmission data according to a seventh embodiment of the present disclosure; and FIG. 16 is a diagram illustrating a correspondence relation between baseband data and transmission data according to an eighth embodiment of the present disclosure.

DETAILED DESCRIPTION

Embodiments according to the present disclosure are explained with reference to drawings.

[1. First Embodiment]
[1.1. Configuration]

Figure 1:
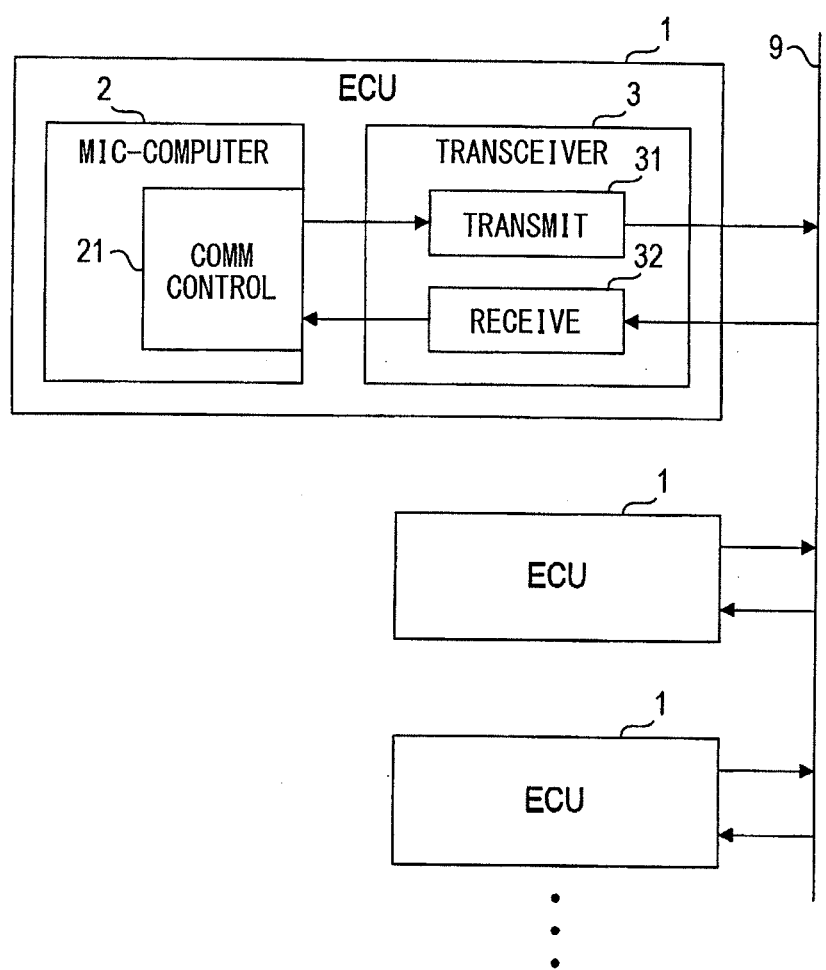
FIG. 1 is a block diagram illustrating a configuration of a communication system according to a first embodiment of the present disclosure.

With reference to FIG. 1, a communications system includes a plurality of electronic control units (hereinafter "ECUs") 1 mounted in a vehicle, which is also referred to as a host vehicle. The ECUs 1 are communicatively connected to a bus 9, which is a common transmission line, to form a network (in-vehicle LAN (Local Area Network)). The respective ECUs 1 communicate with each other or perform two way communication according to a predetermined protocol such as CAN (Control Area Network) via the bus 9. That is, this communications system permits each of the ECUs 1 to function as a node (communication apparatus). The ECUs 1 include, for example, an engine ECU which performs engine control; a brake ECU which performs brake control; a steering wheel ECU which performs steering control; and a suspension ECU which performs suspension control.

Usually, each ECU 1 includes a microcomputer 2 and a transceiver 3. The microcomputer 2 includes a communication controller 21 in addition to a usual configuration having a CPU, a ROM, a RAM, and an IO port; the communication controller 21 performs a control process of parts of the vehicle, and a communication process with another ECU 1.

The communication controller 21 performs a communication process such as transmission and reception of a frame, reconciliation control, communication error handling according to predetermined protocols such as CAN (Controller Area Network). The communication controller 21 outputs baseband data (baseband signal) to the transceiver 3 as low-level/high-level transmission signals. In addition, the communication controller 21 receives baseband data indicating the contents of transmission data from the transceiver 3 as low-level/high-level reception signals; the transceiver 3 receives the baseband data via the bus 9.

The transceiver 3 is an interface IC (Integrated Circuit) to perform relay functions between the microcomputer 2 and the bus 9; the transceiver 3 includes a transmission circuit 31 and a reception circuit 32. The transmission circuit 31 converts the baseband data (transmission signal, which may be also referred to as original baseband data), which is received from the microcomputer 2, into transmission data (i.e., after-conversion baseband data), and transmits the transmission data to the bus 9. The reception circuit 32 converts the transmission data (reception signal), which is received from the bus 9, into the baseband data (i.e., restores the baseband data), and then outputs the restored baseband data (i.e., after-restoration baseband data) to the microcomputer 2.

[1.2. Transmission and Reception of Transmission Data]

The following explains transmission and reception of transmission data. With reference to FIG. 2A and FIG. 2B, in the ECU 1 serving as a transmitter or transmission side, the microcomputer 2 outputs a baseband data A to the transmission circuit 31, which includes a modulation circuit 311 and a serializer 312. The modulation circuit 311 performs a conversion to convert the baseband data A into a modulation data and outputs the modulation data to the serializer 312 as a parallel data B. the modulation data is equivalent to one symbol of transmission data, which will be explained later. It is noted that the above conversion is to convert baseband data, if once determined, into modulation data uniquely, and to perform only pattern matching to permit an easy combinational circuit to achieve the conversion.

Then, the serializer 312 performs a conversion to convert the received parallel data B to a serial data C, and transmits the serial data C to the bus 9 as a transmission data. To be specific, the serializer 312 not only converts the received parallel data B into a serial data, but also adds a training pattern and a comma pattern to a head of the transmission data (as a header in front of the data part equivalent to the parallel data B).

The training pattern is a bit pattern, which indicates a bit period (time period of one bit) of the transmission data to permit a reception side (i.e., a CDR circuit 321 mentioned later) to specify a bit period of the transmission data. For example, the training pattern uses a bit pattern "101010", which consists of repeated patterns of "10" and in which the number of "0"s is the same as the number of "1"s.

The comma pattern permits the reception side to specify a unit of symbol (modulation data) (i.e., permitting a phase synchronization on a symbol-by-symbol basis); thus, the number of bits (i.e., the bit number) included in the comma pattern is designated to be identical to the number of bits included in one symbol (e.g., 4 bits in the present embodiment), which is mentioned later. For example, the comma pattern uses a bit pattern "1100", which is different from the training pattern and in which the number of "0"s is the same as the number of "1"s.

In the ECU 1 serving as a receiver or reception side, the reception circuit 32 includes a CDR (Clock Data Recovery) circuit 321 and a de-serializer 322; the reception circuit 32 recovers a clock and data and converts the data into a parallel data D. At this time, the CDR circuit 321 specifies a bit period of the transmission data based on the training pattern and synchronizes on a bit-by-bit basis to thereby specify a bit pattern of the transmission data.

The parallel data D outputted by the de-serializer 322 is converted by a demodulator circuit 323 in the reception circuit 32 into a baseband data E; namely, the baseband data E is restored. That is, the conversion (also referred to as second conversion) of the demodulation circuit 323 is the reverse of the conversion (also referred to as first conversion) of the modulation circuit 311 mentioned above. This second conversion by the demodulation circuit 323 is also to perform only pattern matching to permit an easy combinational circuit to achieve the second conversion, like by the modulation circuit 311.

[1.3. Communication Example]

The following explains a specific example of communication performed by the communication system according to the first embodiment with reference to FIG. 3. The communication system according to the first embodiment performs communication equivalent to BPSK (Binary Phase Shift Keying) in modulation communication.

In the ECU 1 of the transmission side, the microcomputer 2 outputs a baseband data (for example, "101001"); then, the transmission circuit 31 of the transceiver 3 transmits a transmission data to the bus 9. The transmission data is transmitted in the following order of a training pattern, a comma pattern, and then a data equivalent to the baseband data. To be specific, the transmission circuit 31 performs a first conversion to convert each one bit of the baseband data into modulation data and then transmits the modulation data to the bus 9 as the transmission data. The modulation data has two kinds of bit patterns; each bit pattern has four bits (i.e., a 4-bit bit pattern). That is, each one bit of the baseband data is converted into one kind of 4-bit bit pattern among two kinds of 4-bit bit patterns according to the value of the bit of the baseband data. Further, a bit of the baseband data may be also referred to as a primary bit or a baseband bit, whereas a bit of the modulation data may be also referred to as a secondary bit or a modulation bit.

With reference to FIG. 3, the baseband data "1" is converted into a 4-bit modulation data "1010" of a first kind among two kinds; the baseband data "0" is converted into a 4-bit modulation data "0101" of a second kind among two kinds. That is, the bit pattern of the first kind has a relation of bit inversion with the bit pattern of the second kind. In other words, the bit pattern of the first kind has a relation of a phase shifted with the bit pattern of the second kind (i.e., the bit patterns of two kinds have respective phases that are shifted from each other). Further, each 4-bit bit pattern of the modulation data has the number of bits that is even; each 4-bit bit pattern is formed such that the number of "0"s is the same as the number of "1"s, like in the training pattern or comma pattern.

In the ECU 1 of the reception side, the reception circuit 32 receives the transmission data via the bus 9, and restores the baseband data from the received transmission data by performing a second conversion that is the reverse of the first conversion performed by the transmission circuit 31. To be specific, the reception circuit 32 specifies a bit period (time period of one bit) of the transmission data based on the training pattern, and specifies a unit of symbol (i.e., a symbol unit) based on the comma pattern. Such specification of a symbol unit permits phase synchronization on a symbol-by-symbol basis. When a data of a symbol unit received subsequently is "0101", the data is converted into "0"; when a data of a symbol unit received subsequently is "1010", the data is converted into "1". Those bits after the second conversion are outputted to the microcomputer 2. This permits the reception side to restore the baseband data that were outputted by the microcomputer 2 of the transmission side.

1.4. Advantageous Effect (1) The first embodiment suppresses the following technical issues A and B, for example.

[Technical Issue A]

An in-vehicle communication system is known which communicatively connects several devices such as ECUs via a single common bus to perform data transmission with proper timing to prevent the several devices from transmitting simultaneously. Such a communication system may undergo, in a characteristic impedance of the bus, a variation due to the input capacitances of devices or branching portions of the bus. Such a variation may cause a frequency characteristic (i.e., a transit characteristic or a damping characteristic) to decrease a transmission power rapidly at a specific frequency, as illustrated in FIG. 4. FIG. 4 illustrates one example of a frequency characteristic to have a specific frequency (referred to as a falling frequency, notch frequency, or dip frequency) of which the transmission power is degraded rapidly. Another communication system may provide a different example to decrease a transmission power at a different specific frequency or to have more than one specific frequency of which the transmission power falls rapidly.

Figure 5A:
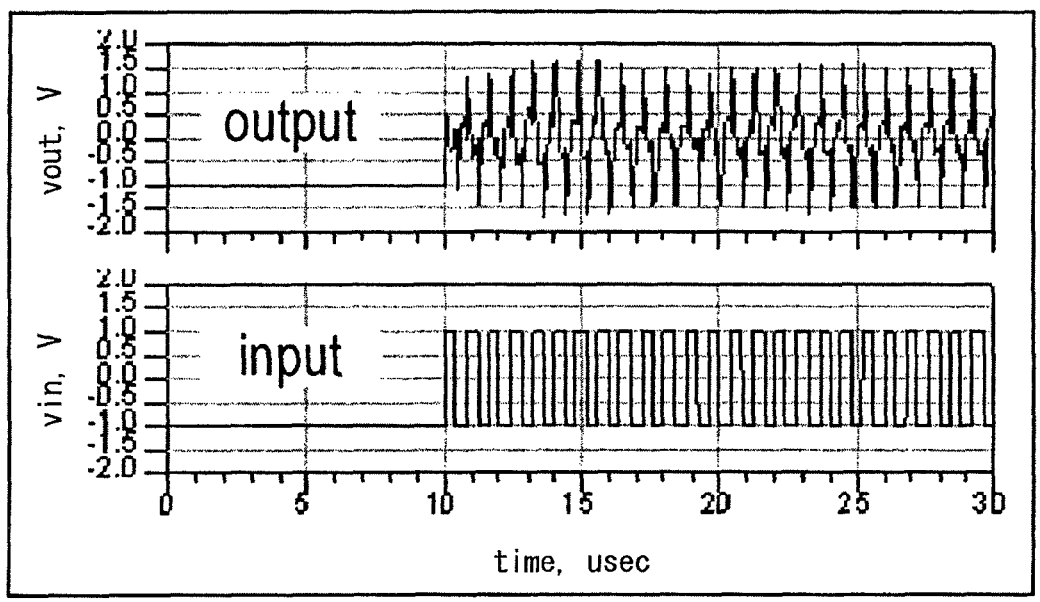
FIG. 5A is a diagram illustrating output waveforms and input waveforms as a comparative example.
Figure 5B:
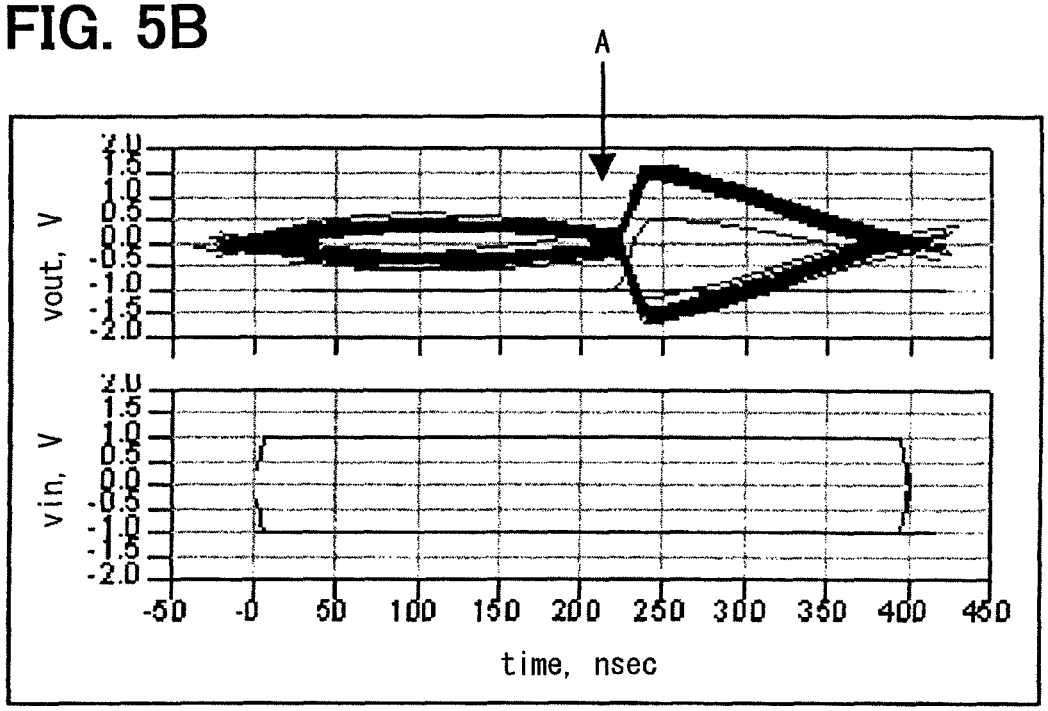
FIG. 5B is a diagram illustrating an eye pattern of the output waveforms and the input waveforms.

For example, suppose a case when a signal of 2.5 Mbps is transmitted via a transmission line which has a notch characteristic around 1 MHz as indicated in FIG. 4. In such a case, the output waveforms outputted from the transmission line are significantly distorted against the input waveforms inputted into the transmission line, as indicated in FIG. 5A. The eye pattern of the output waveforms is shaped to have a crashed or distorted portion A around a center as compared with that of the input waveforms, as indicated in FIG. 5B. The crashed portion is typically a portion to capture data; however, the example in FIG. 5B is closed at the crashed portion to possibly cause data error. The fundamental wave of 2.5 Mbps corresponds to 1.25 MHz, which is different from 1 MHz; however, a waveform distortion occurs around 1 MHz as shown in this example.

[Technical Issue B]

A conventional communication of vehicular control information has been providing 1 Mbps or less without requiring a higher data rate. In recent years, the advancement of control requires a higher data rate of several Mbps. However, the communication with the data rate of several Mbps provides comparatively large signal power around 500 kHz to 1.5 MHz, which is emitted undesirably as spurious radiation. This frequency band (500 kHz to 1.5 MHz) is similar to a frequency band of radio wave of an AM radio. An AM radio is easily affected by extraneous noise, in particular. The use of the data rate of several Mbps in communication of control information needs a shield in order to suppress influence on the AM radio; this increases costs.

Figure 6A:
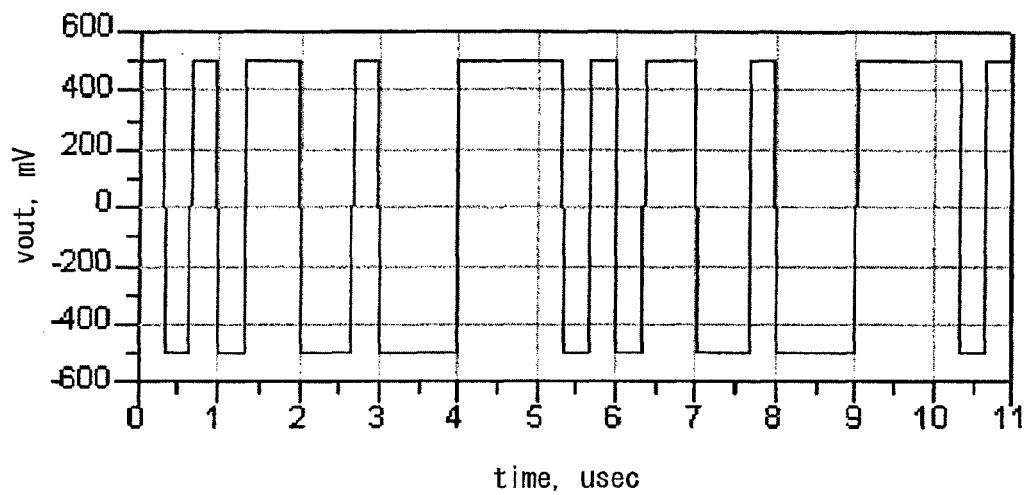
FIG. 6A is a diagram illustrating waveforms arising when transmitting pseudo random data.
Figure 6B:
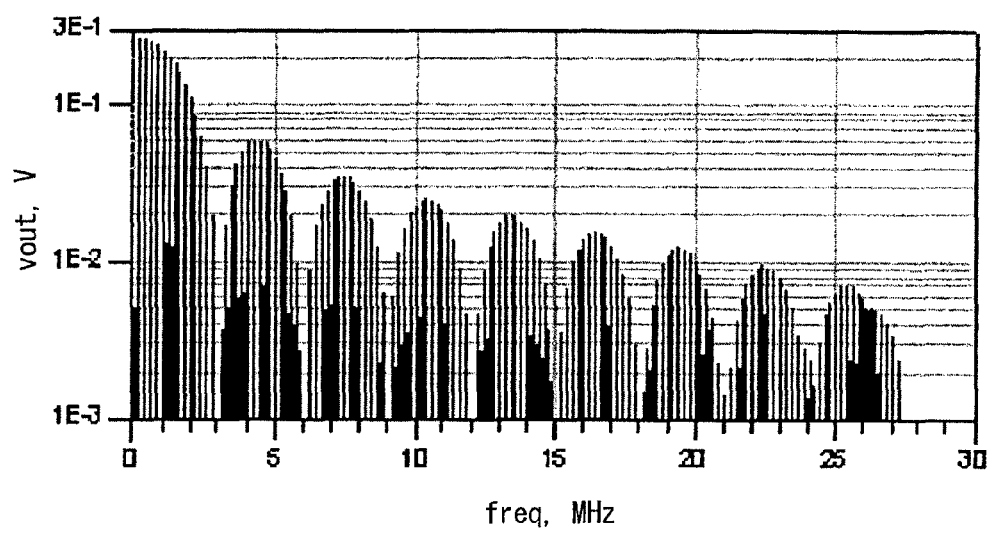
FIG. 6B is a diagram illustrating a spectrum after applying Fourier transformation to the waveforms of FIG. 6A.

The following shows an example. FIG. 6A illustrates waveforms at the time of transmitting pseudo-random data of PRBS4 at 3 Mbps. FIG. 6B illustrates a spectrum after applying Fourier transformation to the waveforms. As indicated in FIG. 6B, a large electricity component appears in a range from 500 kHz to 1.5 MHz.

An effective procedure to suppress the above technical issues A and B is to perform communication which decreases a specific frequency component. Such communication may be known as modulation communication, indicated in FIG. 7, for example.

Figure 7:
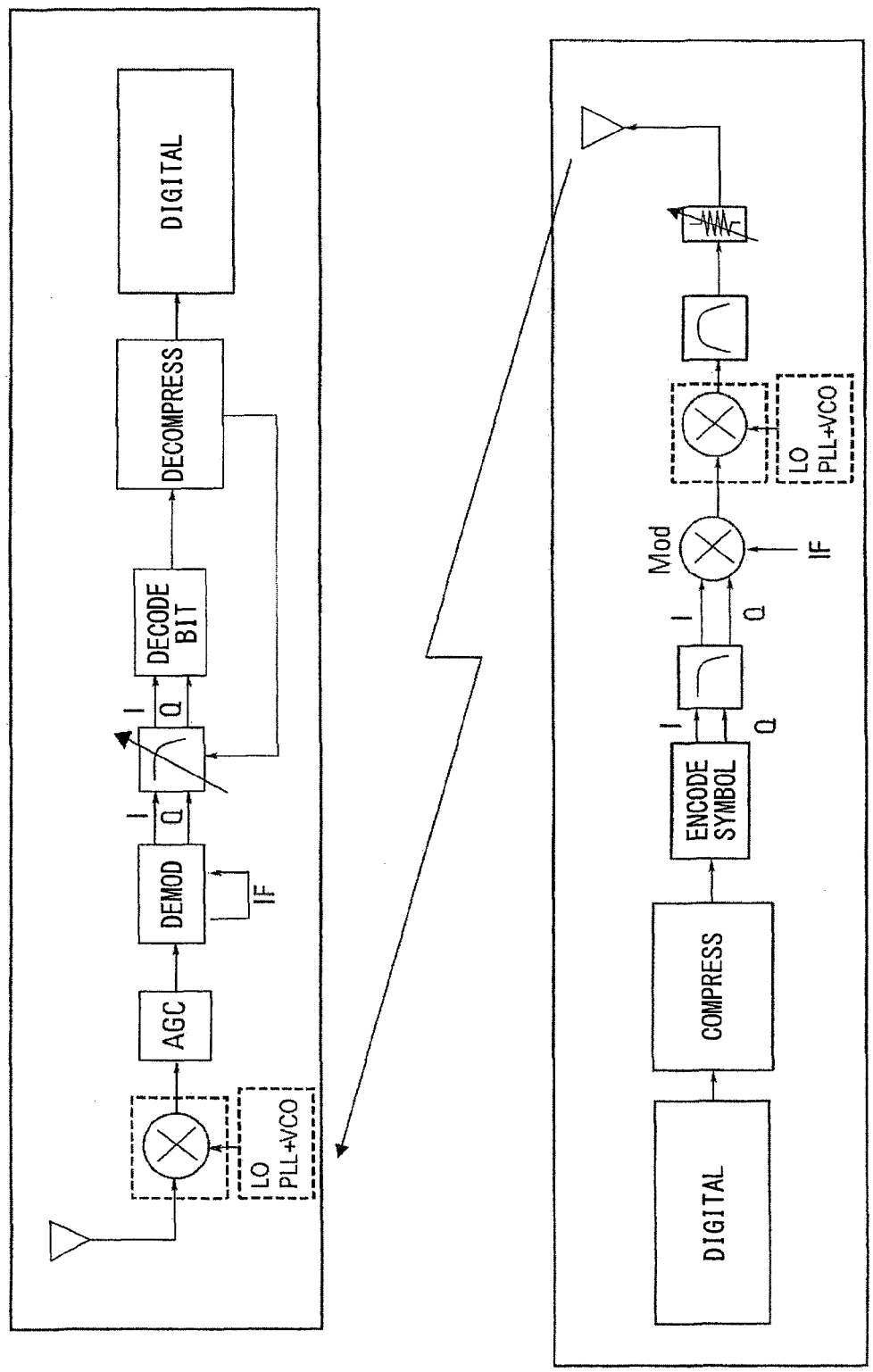
FIG. 7 is a diagram illustrating a modulation communication circuit using an analog circuit such as a mixer.

The configuration indicated in FIG. 7 is the same as the configuration described in Nonpatent Literature 1 mentioned above. An analog circuit such as a mixer applies frequency conversion to digital data to transmit as radio waves. Such a configuration to transmit the radio waves in free space may be replaced by a configuration to transmit the portion of the radio waves in a transmission line; the configuration in the transmission line permits the transmission signal to exhibit an energy distribution at a frequency different from that of the original digital data, thereby suppressing or improving the technical issues A and B.

However, the above configuration uses many analog circuits such as a mixer; this may produce another different technical issue to increase difficulty in designing, increase the sizes of circuits, or reduce noise tolerance. In contrast, the communication system according to the first embodiment suppresses or improves the above different technical issues while suppressing the technical issues A and B like the modulation communication described in FIG. 7. That is, the communication system according to the first embodiment permits the transmission data on the bus to be data with a bit rate higher than that of the baseband data; this can adjust the frequency component of the transmission data. Further, the transmission data is prepared by converting every one bit of the baseband data into a bit pattern of 4 bits, the bit period of which can be specified based on the training pattern. This can adjust the frequency component of the transmission data with a comparatively simple configuration which need not use an analog circuit such as a mixer.

To be more specific, the ECU 1 of a transmission side changes a phase of transmission data depending on baseband data like a modulation communication technology does; thus, the energy of the baseband data is moved to approach a bit rate of the transmission data. Such configuration reduces the energy near a specific frequency (1 MHz in the example mentioned above), to avoid the influence of the frequency characteristic of the transmission line, and reduce the noise to an AM radio. A modulation signal using a mixer provides generally a configuration where the phase of the carrier and the phase of the baseband data are uncorrelated with each other. In contrast, the present embodiment provides a configuration where the two phases are permitted to be identical to each other; this enables the ECU 1 of a reception side to recover a clock and data (to achieve CDR). As illustrated in FIG. 3, in order for the reception side to receive the transmission data normally with CDR, an undesirable pulse, which undesirably causes a reception side to perform the clock data recovery of 0.5-bit width or 1.5-bit width, need not be contained. Therefore, the transmission side converts one bit of the baseband data into N bits of the transmission data (N being an integer).

The ECU 1 of the reception side recovers the transmission data using a CDR technology used in baseband communication in recent years. The data string of the recovered transmission data is digitally processed to extract the baseband data. The baseband data is extracted by performing symbol synchronization from the symbol contained in the header in front of the data. Thus, the symbol synchronization is enabled from several bits (corresponding to the total bit number of (i) the training pattern and (ii) the comma pattern), affecting hardly communicative latency.

As explained above, as compared with an analog circuit using a mixer, although needing to convert one bit of the baseband data into integral bits of the transmission data, the communication system according to the first embodiment can achieve a comparatively easy circuit configuration using a CDR circuit. Thus, as compared with an analog circuit using a mixer, the above configuration using the CDR circuit can achieve a simple circuit configuration to reduce the circuit size significantly (for example, approximately one tenth (1/10)) and improve noise tolerance. Further, while adopting such an easy circuit configuration, the above configuration changes or converts an original spectrum of the baseband data into a different spectrum of the transmission data; the different spectrum has a frequency characteristic different from that of the original one. Such conversion can enable communication while controlling an energy distribution of transmission signal comparatively easily.

Figure 8A:
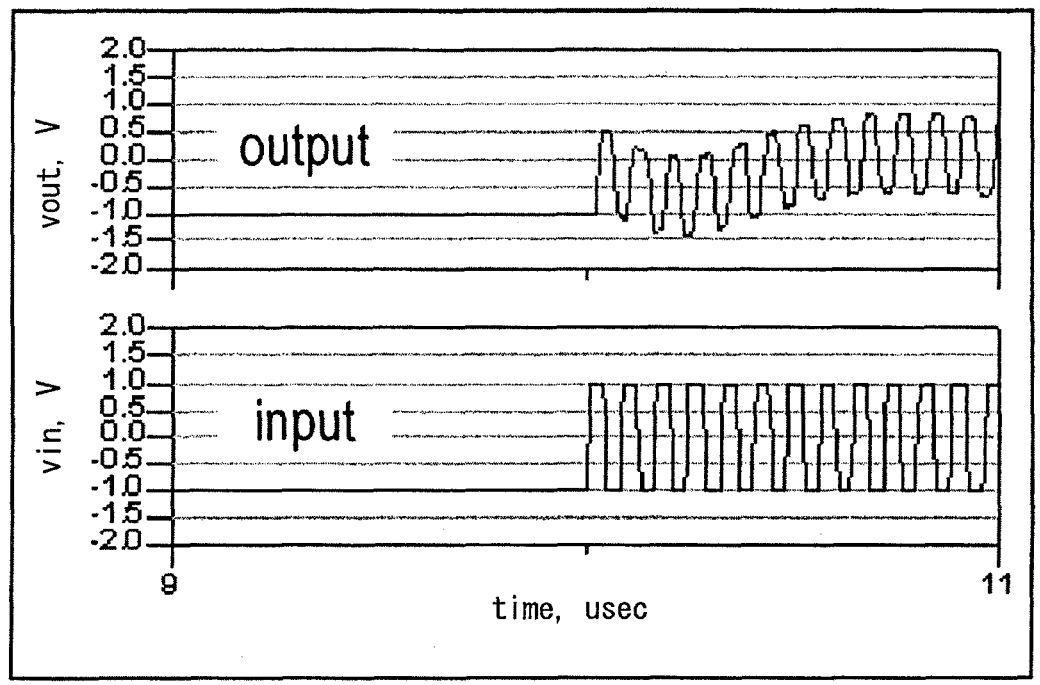
FIG. 8A is a diagram illustrating output waveforms and input waveforms from simulation.
Figure 8B:
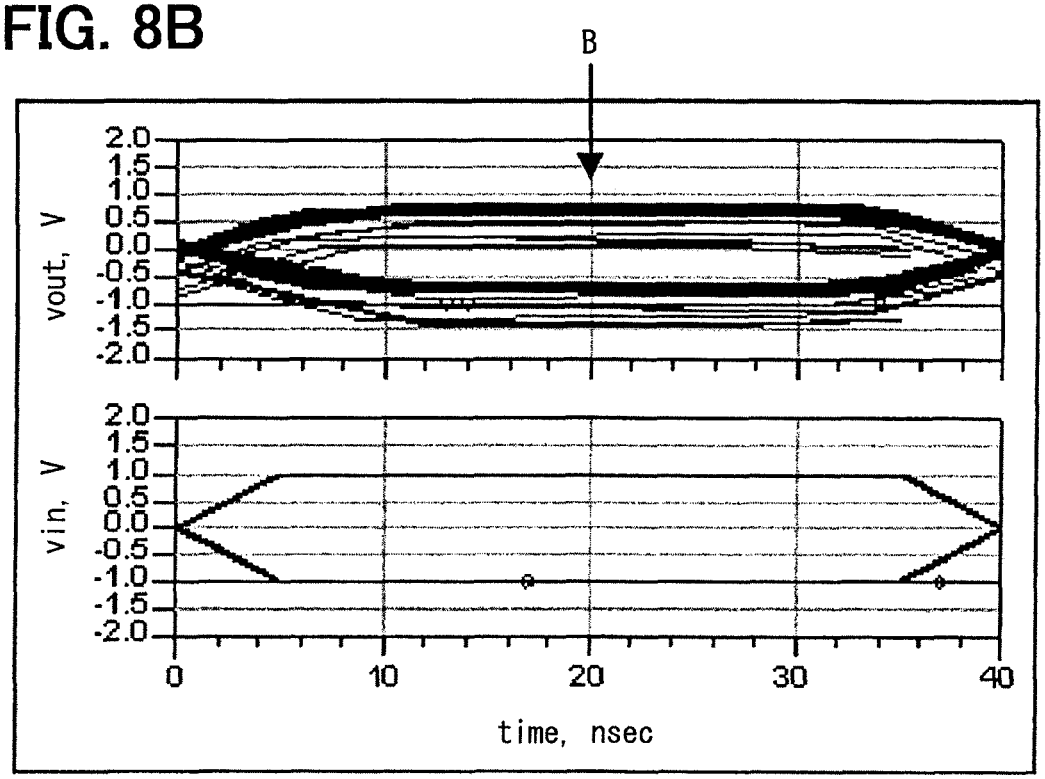
FIG. 8B is a diagram illustrating an eye pattern of the output waveforms and the input waveforms of FIG. 8A.

The following explains an advantageous effect confirmed through simulation. FIGS. 8A and 8B illustrate simulation results of waveforms obtained when the transmission line with a characteristic illustrated in FIG. 4 transmits data at 40 Mbps. Although the first embodiment explains an example of transmission by multiplying a bit rate by four (4) for the purpose of illustration, the multiplying factor of the bit rate may be desirable to be large like this example.

Comparing with the eye pattern indicated in FIG. 5B teaches that the eye pattern indicated in FIG. 8B undergoes smaller influence of a distortion; thus, capture at the portion indicated by Arrow B is permitted to receive data satisfactorily.

In FIG. 8A, the output waveforms show potential fluctuation at a middle point in between "1" and "0", but small enough. In particular, this fluctuation becomes a common mode in differential transmission and does not affect the transmission of the differential mode. In addition, the voltage (vertical width) of the eye pattern is small at a high frequency because of loss in a cable; however, this is solved by providing an amplifier in the input of the ECU 1 of the reception side.

(2) In addition, the first embodiment improves tolerance to the bit error.

That is, the bit error during communication may cause a symbol specified from received data to match with neither the bit pattern "1010" nor the bit pattern "0101". Also in such a case, which one of bit patterns the specified symbol is similar to is determined and restoration of the correct data is thereby enabled with high probability. For example, "1110", if received, is determined as "1010" since "1110" is closer to "1010" than to "0101". This can provide the tolerance to the bit errors to some degree.

(3) In addition, the first embodiment does not require the microcomputer 2 to comply with a high bit rate.

This is because the conversion from baseband data to transmission data and the conversion (restoration) from transmission data to baseband data can be performed by the transceiver 3. The training pattern and the comma pattern are generated by the transceiver instead of or without the microcomputer 2; this eliminates a need of specific execution by the microcomputer 2, to permit use of a conventional microcomputer 2. The performance of a recent microcomputer is improved significantly; thus, the modulation circuit 311 and the demodulation circuit 323 in FIG. 2 may be suitably realized using the recent microcomputer (i.e., processing of a microcomputer).

(4) In addition, the first embodiment enables the number of "0"s and the number of "1"s to be identical in transmission data.

This is because the number of "0"s and the number of "1"s are identical to each other and are even numbers in the bit pattern of each of (i) the training pattern, (ii) the comma pattern, or (iii) the modulation data.

Figure 9:
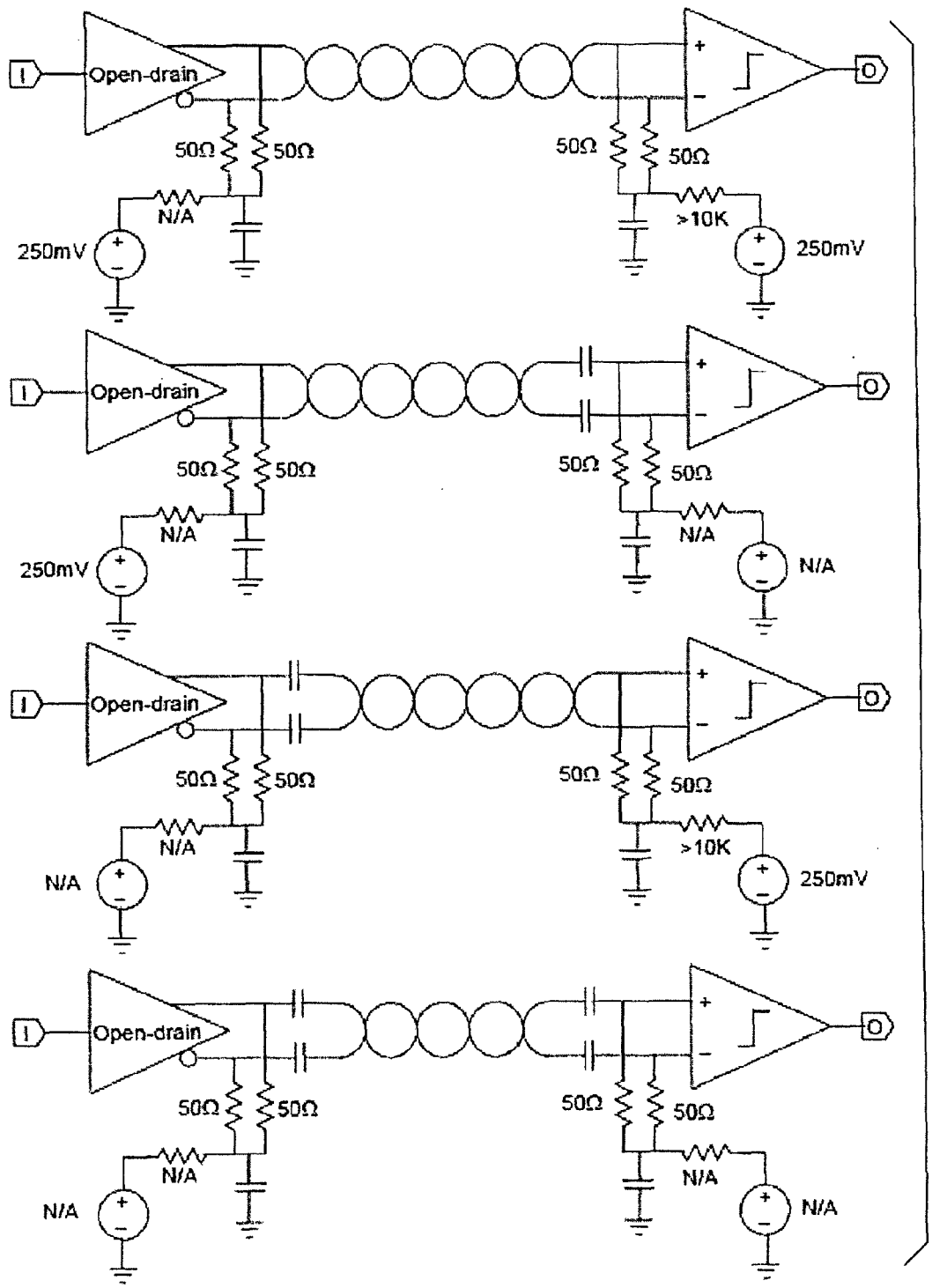
FIG. 9 is a diagram illustrating connections of Serial ATA (Advance Technology Attachment)

That is, an actual communication may use an AC coupling which separates DC connection in between a transmission side (Tx) and a reception sides (Rx). FIG. 9 illustrates an example of wire connection in Serial ATA (Advanced Technology Attachment) being mainly used in HDD. Lower three wire connections among four wire connections in FIG. 9 use capacitors to connect in AC between Tx-Rx, to transmit AC signal but interrupt DC or DC signal. Under the above configuration, when the balance of "0"s and "1"s is not identical in transmission data, the DC balance is not maintained; this causes a transmitted signal level to change. For instance, suppose a bit pattern "1111011110" that repeats 5-bit strings, each 5-bit string having (1) consecutive 4-bit "1"s and (ii) 1-bit "0", for instance. In such example, the DC component does not pass; thus, the bit pattern changes to "0.2, 0.2, 0.2, 0.2, and −0.8" to possibly cause a receiving error.

In contrast, in the first embodiment, the bit number assigned to one symbol is an even number and, further, the bit number of "0"s and the bit number of "1"s are identical to each other; this can maintain the DC balance constantly. Further, in the present embodiment, the ECU 1 is equivalent to an example of a communication apparatus; the bus 9 is equivalent to an example of a transmission line; the transmission circuit 31 is equivalent to an example of a transmitter; and the reception circuit 32 is equivalent to an example of a receiver.

[1.5. Modification Example]

The first embodiment explains an example configuration which converts one bit (i.e., one primary bit) of the baseband data into four bits (four secondary bits) of the transmission data. Without need to be limited to the above, one bit of the baseband data is converted into another bit number (three or more bits). However, like the first embodiment, a communication equivalent to BPSK in modulation communication may be desirably provided to convert one bit of the baseband data into even-numbered bits of the transmission data; the even-numbered bits are equal to or greater than four bits.

In addition, the first embodiment explains that two kinds of bit patterns of the modulation data are phase-shifted from each other by one bit. Without need to be limited to the above, they may be phase-shifted by K bits other than one bit.

[2. Second Embodiment]

A second embodiment has a configuration that is basically the same as that of the first embodiment; thus, different points will be explained mainly while common points are omitted from explanation.

The first embodiment mentioned above provides an example configuration to perform communication equivalent to BPSK in modulation communication. In contrast, the second embodiment provides a communication equivalent to QPSK (Quadrature Phase Shift Keying) in modulation communication, as illustrated in FIG. 10.

In the second embodiment, one symbol of the transmission data transmits two bits of the baseband data. To be specific, the transmission circuit 31 performs a first conversion to convert every two bits of the baseband data A and B into modulation data and then transmits the modulation data to the bus 9 as the transmission data. The modulation data has four kinds of bit patterns; each bit pattern has eight bits (i.e., an 8-bit bit pattern). That is, a pair of two bits of the baseband data A and B is converted into one kind of 8-bit bit pattern among four kinds of 8-bit bit patterns according to the values of the two bits of the baseband data. Further, a bit of the baseband data may be also referred to as a primary bit or a baseband bit, whereas a bit of the modulation data may be also referred to as a secondary bit or a modulation bit.

With reference to FIG. 10, "110010" is transmitted as baseband data A, and "101001" is transmitted as baseband data B, for instance. To be specific, the baseband data A and B of (1, 1) is converted into a 8-bit modulation data "11001100" of a first kind. The baseband data A and B of (1, 0) is converted into a 8-bit modulation data "10011001" of a second kind. The baseband data A and B of (0, 1) is converted into a 8-bit modulation data "00110011" of a third kind. The baseband data A and B of (0, 0) is converted into a 8-bit modulation data "01100110" of a fourth kind. That is, the first to fourth kinds of 8-bit bit patterns correspond to bit values of the baseband data A and B, and are phase-shifted by one bit from one another. Further, each 8-bit bit pattern of the modulation data has the number of bits that is even; each 8-bit bit pattern is formed such that the number of "0"s is the same as the number of "1"s, like in the training pattern or comma pattern.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. It is noted that like in the first embodiment, a training pattern and a comma pattern are transmitted before the data equivalent to the baseband data.

The second embodiment can provide an advantageous effect similar to that of the first embodiment mentioned above. Further, the second embodiment explained the con-figuration which converts 2 bits of baseband data into 8 bits of transmission data. Without need to be limited to the above, two bits of baseband data may be converted into another bit number of transmission data. However, like the second embodiment, a communication equivalent to QPSK in modulation communication may be desirably provided to convert two bits of the baseband data into a bit number of a multiple of 4 of the transmission data; the bit number is equal to or greater than four bits.

In addition, the second embodiment explains that the four kinds of bit patterns of modulation data are phase-shifted from each other by one bit. Without need to be limited to the above, they may be phase-shifted by K bits other than one bit.

[3. Third Embodiment]

A third embodiment has a configuration that is basically the same as that of the first embodiment; thus, different points will be explained mainly while common points are omitted from explanation.

The first embodiment mentioned above provides an example configuration to perform communication equivalent to BPSK in modulation communication. In contrast, the third embodiment provides a communication equivalent to 8PSK (8-Phase Shift Keying) in modulation communication, as illustrated in FIG. 11.

In the third embodiment, one symbol of the transmission data transmits three bits of the baseband data. To be specific, the transmission circuit 31 performs a first conversion to convert every three bits of the baseband data into modulation data and then transmits the modulation data to the bus 9 as the transmission data. The modulation data has eight kinds of bit patterns; each bit pattern has eight bits (i.e., an 8-bit bit pattern). That is, a group of three bits of the baseband data is converted into one kind of 8-bit bit pattern among eight kinds of 8-bit bit patterns according to the values of the three bits of the baseband data. Further, a bit of the baseband data may be also referred to as a primary bit or a baseband bit, whereas a bit of the modulation data may be also referred to as a secondary bit or a modulation bit.

With reference to FIG. 11, "110010" is transmitted as baseband data A, "101010" is transmitted as baseband data B, and "111100" is transmitted as baseband data C, for instance. The baseband data A, B, and C of (1, 1, 1) is converted into an 8-bit modulation data "00011110" of a first kind. The baseband data A, B, and C of (1, 0, 1) is converted into an 8-bit modulation data "01111000" of a second kind. The baseband data A, B, and C of (0, 1, 1) is converted into an 8-bit modulation data "11100001" of a third kind. The baseband data A, B, and C of (0, 0, 1) is converted into an 8-bit modulation data "10000111" of a fourth kind. The baseband data A, B, and C of (1, 1, 0) is converted into an 8-bit modulation data "00111100" of a fifth kind, The baseband data A, B, and C of (0, 0, 0) is converted into an 8-bit modulation data "00001111" of a sixth kind. Although not illustrated in the example, the baseband data A, B, and C of (0, 1, 0) is converted into an 8-bit modulation data "11000011" of a seventh kind. The baseband data A, B, and C of (1, 0, 0) is converted into an 8-bit modulation data "11110000" of an eighth kind. That is, the first to eighth kinds of 8-bit bit patterns, which correspond to bit values of the baseband data A, B, and C, are phase-shifted by one bit from one another. Further, each 8-bit bit pattern of the modulation data has the number of bits that is even; each 8-bit bit pattern is formed such that the number of "0"s is the same as the number of "1"s, like in the training pattern or comma pattern.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. It is noted that like in the first embodiment, a training pattern and a comma pattern are transmitted before the data equivalent to the baseband data.

The third embodiment can provide an advantageous effect similar to that of the first embodiment mentioned above. Further, the third embodiment explained the configuration which converts three bits of baseband data into eight bits of transmission data. Without need to be limited to the above, three bits of baseband data may be converted into another bit number of transmission data. However, like the third embodiment, a communication equivalent to 8PSK in modulation communication may be desirably provided to convert three bits of the baseband data into a bit number of a multiple of 8 of the transmission data; the bit number is equal to or greater than eight bits.

In addition, the third embodiment explains that the eight kinds of 8-bit bit patterns of modulation data are phase-shifted from one another by one bit. Without need to be limited to the above, they may be phase-shifted by K bits other than one bit.

[4. Fourth Embodiment]

A fourth embodiment has a configuration that is basically the same as that of the first embodiment; thus, different points will be explained mainly while common points are omitted from explanation.

The first embodiment mentioned above provides an example configuration to perform communication equivalent to BPSK in modulation communication. In contrast, the fourth embodiment provides a communication equivalent to DQPSK (Differential Quadrature Phase Shift Keying) in modulation communication, as illustrated in FIG. 12.

The second embodiment changes the baseband data A and the baseband data B with an identical timing. In contrast, the fourth embodiment is to change the baseband data A and the baseband data B with different timings (shifted by a half of bit (0.5 bit)), to thereby achieve a communication which is equivalent to DQPSK in modulation communication. To be specific, the transmission circuit 31 performs a first conversion to convert every two bits of the baseband data into modulation data and then transmits the modulation data to the bus 9 as the transmission data. The modulation data has four kinds of bit patterns; each bit pattern has four bits (i.e., a 4-bit pattern). That is, a pair of two bits of the baseband data is converted into one kind of 4-bit bit pattern among four kinds of 4-bit bit patterns according to the values of the two bits of the baseband data. Further, a bit of the baseband data may be also referred to as a primary bit or a baseband bit, whereas a bit of the modulation data may be also referred to as a secondary bit or a modulation bit. That is, the baseband data includes baseband data A and baseband data B. The baseband data A changes to a following bit with a first timing t1 (=2T× J+T (T is a period; J is an integer equal to or greater than zero)). The baseband data B changes to a following bit with a second timing t2 (=2T×J). The transmission circuit 31 converts two bits, which consist of (i) one bit of the baseband data A and (ii) one bit of the baseband data B, into modulation data every the period of T (a half of the bit period of the baseband data). The above modulation data is one kind of 4-bit bit pattern among four kinds of 4-bit bit patterns according to the values of the two bits of the baseband data.

As illustrated in FIG. 12, the baseband data A and B of (0, 1) is converted into a 4-bit modulation data "1001" of a first kind. The baseband data A and B of (1, 1) is converted into a 4-bit modulation data "0110" of a second kind. The baseband data A and B of (1, 0) is converted into a 4-bit modulation data "1100" of a third kind. The baseband data A and B of (0, 0) is converted into a 4-bit modulation data "0011" of a fourth kind. That is, the first to fourth kinds of 4-bit bit patterns, which correspond to bit values of the baseband data A and B, are phase-shifted by one bit from one another. Further, each 4-bit bit pattern of the modulation data has the number of bits that is even; each 4-bit bit pattern is formed such that the number of "0"s is the same as the number of "1"s, like in the training pattern or comma pattern.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. The fourth embodiment can provide an advantageous effect similar to that of the first embodiment mentioned above. In addition, the fourth embodiment differentiates the timings, which change to following bits, in between the baseband data A and the baseband data B; this reduces the change of the baseband data to decrease an occurrence of distortion.

Further, the fourth embodiment explained the configuration which converts two bits of baseband data into four bits of transmission data. Without need to be limited to the above, two bits of baseband data may be converted into another bit number of transmission data. However, like the fourth embodiment, a communication equivalent to DUSK in modulation communication may be desirably provided to convert two bits of the baseband data into a bit number of a multiple of 4 of the transmission data; the bit number is equal to or greater than four bits.

In addition, the fourth embodiment explains that the four kinds of 4-bit bit patterns of modulation data are phase-shifted from one another by one bit. Without need to be limited to the above, they may be phase-shifted by K bits other than one bit.

[5. Fifth Embodiment]

A fifth embodiment has a configuration that is basically the same as that of the first embodiment; thus, different points will be explained mainly while common points are omitted from explanation.

The first to fourth embodiments provide an example configuration to convert baseband data into transmission data in which predetermined bit patterns such as "0101" or "0011" are repeated. In contrast, the fifth embodiment provides an example configuration to convert baseband data into a bit pattern based on a pseudo random pattern such as PRBS (Pseudo Random Binary Sequence), as indicated in FIG. 13. To be specific, the transmission circuit 31 performs a first conversion to convert each one bit of the baseband data into modulation data and then transmits the modulation data to the bus 9 as the transmission data. The modulation data has two kinds of bit patterns (i.e., first modulation data and second modulation data); each bit pattern has fifteen bits (i.e., a 15-bit bit pattern). That is, each one bit of the baseband data is converted into one kind of 15-bit bit pattern among two kinds of 15-bit bit patterns according to the value of the bit of the baseband data. Further, a bit of the baseband data may be also referred to as a primary bit or a baseband bit, whereas a bit of the modulation data may be also referred to as a secondary bit or a modulation bit. With reference to FIG. 13, the baseband data of "1" is converted into a first 15-bit modulation data "111100010011010" of a first kind; the baseband data of "0" is converted into a second 15-bit modulation data "000011101100101" of a second kind. That is, the first modulation data (i.e., the first kind of 15-bit bit pattern) is the same as a 15-bit pseudo random pattern (referred in FIG. 13 as PRP); the second modulation data (i.e., the second kind of 15-bit bit pattern) is a bit pattern which is bit reversed from that of the first modulation data.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. The fifth embodiment can provide similarly advantageous effects (1) to (3) of the first embodiment mentioned above. In addition, the fifth embodiment can disperse energy in a wider frequency range. The first to fourth embodiments provide an example configuration to convert baseband data into transmission data in which predetermined bit patterns such as "0101" or "0011" are repeated; thus, the bit patterns include many repetitions of "01", thereby proving comparatively high energy to a frequency equivalent to a carrier. In contrast, the fifth embodiment transmits a first bit string "111100010011010", which is a 15-bit pseudo random pattern according to PRBS4, and a second bit string "000011101100101", which is bit-inversed from the first bit string. The pseudo random pattern is a bit pattern determined mathematically; such a bit pattern does not have a specific frequency component (i.e., the frequency component is dispersed). Therefore, using such a pseudo random pattern enables an energy to disperse in a wider frequency range. As a result, the fifth embodiment can perform a communication equivalent to BPSK while suppressing a high energy from focusing on a specific frequency.

Further, the fifth embodiment explained the configuration which converts one bit of baseband data into fifteen bits of transmission data. Without need to be limited to the above, one bit of baseband data may be converted into another bit number of transmission data. However, a pseudo random pattern has odd-numbered bits, thereby assigning one symbol with odd-numbered bits. To that end, like a conventional technology, baseband data is subjected to an encoding such as 8b10b encoding which can maintain a DC balance, and then is modulated using PRBS, to permit waveforms after modulation to maintain the DC balance.

[6. Sixth Embodiment]

A sixth embodiment has a configuration that is basically the same as that of the first embodiment; thus, different points will be explained mainly while common points are omitted from explanation.

The fifth embodiment provides an example configuration to use a 15-bit pseudo random pattern as first modulation data. In contrast, as illustrated in FIG. 14, the sixth embodiment uses, as first modulation data, first to third divisional bit patterns, which are formed by dividing equally a 15-bit pseudo random pattern into first to third divisional bit patterns. To be specific, the transmission circuit 31 performs a first conversion to convert each one bit of the baseband data into modulation data and then transmits the modulation data to the bus 9 as the transmission data. The modulation data has two kinds of bit patterns (i.e., first modulation data and second modulation data); each bit pattern has five bits (i.e., a 5-bit bit pattern). That is, each one bit of the baseband data is converted into one kind of 5-bit bit pattern among two kinds of 5-bit bit patterns according to the value of the bit of the baseband data. Further, a bit of the baseband data may be also referred to as a primary bit or a baseband bit, whereas a bit of the modulation data may be also referred to as a secondary bit or a modulation bit. It is noted that each of the first modulation data and the second modulation data is provided with three kinds of 5-bit bit patterns. The transmission circuit 31 converts the (3×P+Q)-th bit using the Q-th 5-bit bit pattern; P is an integer equal to or greater than zero, and Q is greater than zero and not greater than three.

With reference to FIG. 14, "1" of baseband data is converted into one of three 5-bit bit patterns based on a transmission order; the three 5-bit bit patterns are "11110", "00100", and "11010", into which a 15-bit pseudo random pattern "111100010011010" is divided equally. To be specific, the (3×P+1)-th in baseband data being "1" is converted into "11110", the (3×P+2)-th being "1" is converted into "00100", the (3×P+3)-th being "1" is converted into "11010", respectively. For example, suppose that baseband data is "111". The first "1" is converted into "11110", the second "1" is converted into "00100", and the third "1" is converted into "11010", respectively.

Similarly, "0" of baseband data is converted into one of three 5-bit bit patterns based on a transmission order; the three 5-bit bit patterns are "00001", "11011", and "00101", into which a 15-bit pattern "000011101100101" is divided equally; this 15-bit pattern "000011101100101" is bit-inversed from the pseudo random pattern "111100010011010". To be specific, the (3×P+1)-th in baseband data being "0" is converted into "00001", the (3×P+2)-th being "0" is converted into "11011", the (3×P+3)-th being "0" is converted into "00101", respectively. For example, suppose that baseband data is "000". The first "0" is converted into "00001", the second "0" is converted into "11011", and the third "0" is converted into "00101", respectively.

With reference to FIG. 14, the baseband data is "101001". In this case, the first "1" is converted into "11110", the second "0" is converted into "11011", and the third "1" is converted into "11010", respectively. The same rule is repeatedly applied to on and after the fourth. The fourth "0" is converted into "00001", the fifth "0" is converted into "11011", and the sixth "1" is converted into "11010", respectively. That is, the first modulation data is part of a 15-bit pseudo random pattern; the second modulation data is bit-inversed from the first modulation data.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. It is noted that like in the first embodiment, a training pattern and a comma pattern are transmitted before the data equivalent to the baseband data.

The sixth embodiment can provide an advantageous effect similar to that of the fifth embodiment mentioned above. In addition, the sixth embodiment can decrease the bit number of the modulation data. That is, the fifth embodiment converts one bit of baseband data into a 15-bit bit pattern according to PRBS4. This requires an LSI to include a PLL (Phase-Locked Loop) 15 times in frequency in order to convert one bit into fifteen bits; including the PLL 15 times in frequency needs a too high conversion frequency and increases the size of the circuit. In contrast, the sixth embodiment divides 15 bits into three 5 bits, which are used as modulation data individually. This can achieve the conversion into a pseudo random pattern while decreasing the bit number of modulation data.

The sixth embodiment explained an example configuration to divide equally a 15-bit pseudo random pattern into three. Without need to be limited to the above, another may be adopted. That is, a pseudo random pattern is divided equally into I divisional bit patterns from the first to I-th. The Q-th bit pattern is used for conversion of the (I×P+Q)-th.

[7. Seventh Embodiment]

A seventh embodiment has a configuration that is basically the same as that of the first embodiment; thus, different points will be explained mainly while common points are omitted from explanation.

The sixth embodiment provides an example configuration to use, as first modulation data, a bit pattern of five bits that is one of three 5-bit bit patterns, into which a 15-bit pseudo random pattern is equally divided. In contrast, with reference to FIG. 15, the seventh embodiment divides a 15-bit pseudo random pattern into a 10-bit bit pattern and a 5-bit bit pattern. To be more specific, the first 15-bit pseudo random pattern is divided into (i) a first 10-bit bit pattern, which ranges from the first bit to the tenth bit, and (ii) a first 5-bit bit pattern, which ranges from the eleventh bit to the fifteenth bit. The first 15-bit pseudo random pattern is followed by the second 15-bit pseudo random pattern, which is divided into (i) a second 5-bit bit pattern, which ranges from the first bit to the fifth bit and (ii) a second 10-bit bit pattern, which ranges from the sixth bit to the fifteenth bit. The first 10-bit bit pattern turns into the first symbol with ten bits. The first 5-bits bit pattern is combined with the second 5-bit bit pattern to turn into the second symbol with 10 bits. The second 10-bit bit pattern turns into the third symbol with ten bits. In other words, two 15-bit pseudo random patterns are combined in series to form a 30-bit pattern, which is then divided equally into three 10-bit divisional bit patterns. These first to third 10-bit divisional bit patterns are used individually as first modulation data. To be specific, the transmission circuit 31 performs a first conversion to convert each one bit of the baseband data into modulation data and then transmits the modulation data to the bus 9 as the transmission data. The modulation data has two kinds of bit patterns (i.e., first modulation data and second modulation data); each bit pattern has ten bits (i.e., a 10-bit bit pattern). That is, each one bit of the baseband data is converted into one kind of 10-bit bit pattern among two kinds of 10-bit bit patterns according to the value of the bit of the baseband data. Further, a bit of the baseband data may be also referred to as a primary bit or a baseband bit, whereas a bit of the modulation data may be also referred to as a secondary bit or a modulation bit. It is noted that each of first modulation data and second modulation data is assigned with three different kinds of 10-bit bit patterns. The transmission circuit 31 converts the (3×P+Q)-th bit using the Q-th bit pattern; P is an integer equal to or greater than zero, and Q is greater than zero and not greater than three.

With reference to FIG. 15, "1" of baseband data is converted into one of three different 10-bit bit patterns based on a transmission order; the three different 10-bit bit patterns are "1111000100", "1101011110", and "0010011010", into which two 15-bit pseudo random patterns of "111100010011010"+"111100010011010" is divided equally. To be specific, the (3×P+1)-th in baseband data being "1" is converted into "1111000100", the (3×P+2)-th being "1" is converted into "1101011110", the (3×P+3)-th being "1" is converted into "0010011010", respectively.

Similarly, "0" of baseband data is converted into one of three different 10-bit bit patterns based on a transmission order; the three different 10-bit bit patterns are "0000111011", "0010100001", and "1101100101", into which a 30-bit bit pattern is divided equally; the 30-bit pattern is bit-inversed from two pseudo random patterns of "111100010011010"+"111100010011010". To be specific, the (3×P+1)-th in baseband data being "0" is converted into "0000111011", the (3×P+2)-th being "0" is converted into "0010100001", the (3×P+2)-th being "0" is converted into "1101100101", respectively.

Thus, as illustrated in FIG. 15, the baseband data is "101001". The first "1" is converted into "1111000100", the second "0" is converted into "0010100001", and the third "1" is converted into "0010011010", respectively. The same rule is repeatedly applied to on and after the fourth. The fourth "0" is converted into "0000111011", the fifth "0" is converted into "0010100001", and the sixth "1" is converted into "0010011010", respectively. That is, the first modulation data is part of a 15-bit pseudo random pattern; the second modulation data is bit-inversed from the first modulation data.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. It is noted that like in the first embodiment, a training pattern and a comma pattern are transmitted before the data equivalent to the baseband data.

The seventh embodiment can provide an advantageous effect similar to those of the fifth and sixth embodiments mentioned above. In addition, the seventh embodiment permits the bit number of modulation data to be an even number. The seventh embodiment explained a configuration which divides a 15-bit pseudo random pattern into 10 bits and 5 bits. Without need to be limited to the above, another may be adopted. That is, an SN-bits bit pattern is formed by arraying a plurality of pseudo random patterns and divided equally into S divisional bit patterns from the first divisional bit pattern to the S-th divisional bit pattern, S being an integer equal to or greater than two; each of the divisional bit pattern consists of N bits. The transmission circuit 31 may convert the (3×P+Q)-th bit using the Q-th bit pattern; P is an integer equal to or greater than zero, and Q is greater than zero and not greater than three.

[8. Eighth Embodiment]

An eighth embodiment has a configuration that is basically the same as that of the first embodiment; thus, different points will be explained mainly while common points are omitted from explanation.

The first to fourth embodiments provide an example configuration to change the phase of transmission data, which consist of repeated data, based on baseband data. The fifth to seventh embodiments provide an example configuration to change the polarity of transmission data, which consists of pseudo random patterns, based on baseband data. In contrast, the eighth embodiment is to change the frequency of transmission data, which consist of repeated data, based on baseband data, as indicated in FIG. 16. To be specific, the transmission circuit 31 performs a first conversion to convert each one bit of the baseband data into modulation data and then transmits the modulation data to the bus 9 as the transmission data. The modulation data has two kinds of bit patterns; each bit pattern has eight bits (i.e., an 8-bit bit pattern). That is, each one bit of the baseband data is converted into one kind of 8-bit bit pattern among two kinds of 8-bit bit patterns according to the value of the bit of the baseband data. Further, a bit of the baseband data may be also referred to as a primary bit or a baseband bit, whereas a bit of the modulation data may be also referred to as a secondary bit or a modulation bit.

In an example of FIG. 16, the baseband data being "1" is converted into an 8-bit modulation data (which is a bit pattern of repetition of a unit of two bits) representing "00110011", which is referred to as first modulation data (i.e., first kind of modulation data). In addition, the baseband data being "0" is converted into an 8-bit modulation data (which is a bit pattern of repetition of a unit of one bit) representing "01010101", which is referred to as second modulation data (i.e., second kind of modulation data). That is, the first modulation data and the second modulation data correspond to two bit values "1" and "0" of the baseband data; the first modulation data is different from the second modulation data in frequency. Further, each 4-bit bit pattern of the modulation data has the number of bits that is even; each 4-bit bit pattern is formed such that the number of "0"s is the same as the number of "1"s, like in the training pattern or comma pattern.

The ECU 1 of the reception side can receive a bit string of "0"s and "1"s by the CDR circuit 321; based on the received bit string, baseband data can be restored with a second conversion that is the reverse of the first conversion by the ECU 1 of the transmission side. It is noted that like in the first embodiment, a training pattern and a comma pattern are transmitted before the data equivalent to the baseband data.

The eighth embodiment can provide an advantageous effect similar to that of the first embodiment mentioned above. Further, the eighth embodiment explained the example configuration which converts one bit of baseband data into eight bits of transmission data. Without need to be limited to the above, one bit of baseband data may be converted into another bit number of transmission data. However, like the eighth embodiment, a communication, which permits the frequency of the transmission data to change, may be desirably provided to convert one bit of the baseband data into even-numbered bits of the transmission data; the even-numbered bits are equal to or greater than four bits.

[9. Other Embodiments]

Although the embodiments are described above, the present disclosure is not limited to the embodiments and can be modified in various manners.

(1) The above embodiments explain example configurations to convert every M bits of baseband data; M is one, two, or three. Without need to be limited to the above, M may be more than three, for instance.

(2) The above embodiment explain example configurations to convert every M bits of baseband data into an N-bit bit pattern that has $2^M$ kinds; N is 4, 5, 8, 10, or 15. $2^M$ is the M-th power of 2 (i.e., 2 to the M-th power). Without need to be limited to the above, N may be another value other than the above values.

(3) The above embodiments explain example configurations where the transceiver 3 generates a training pattern and a comma pattern. Without need to be limited to the above, another may be adopted. For example, the microcomputer 2 may output baseband data which is an origin of a training pattern and a comma pattern, and the transceiver 3 may convert the baseband data.

(4) The above embodiments explain example configuration to transmit a training pattern and a comma pattern. Without need to be limited to the above, another may be adopted. For example, when the length of the training pattern and the unit of symbol are predetermined in a reception side, a comma pattern may be not transmitted.

(5) The above embodiments explain a communication system to communicate according to a predetermined protocol such as CAN. However, CAN is only an example; another communication protocol may be used as needed.

(6) The above embodiments explain an ECU as an example of a communication apparatus. Without need to be limited to the above, any apparatus which can communicate may be used.

(7) The CDR circuit is a conventional one (refer to, for example, "Architectures for Multi-Gigabit Wire-Linked Clock and Data Recovery", IEEE-CIRCUITS AND SYSTEMS MAGAZINE, FOURTH QUARTER 2008, P.45-57). The present disclosure can be achieved regardless of types of the CDR circuit; the type of the CDR circuit is not limited to a specific one.

(8) The above embodiments explained example configurations to use a CDR circuit. Without need to be limited to the above, the CDR circuit may be replaced by a data recovery circuit.

(9) Each element of the present disclosure is just an example and need not be limited to the above embodiment. For example, a function of one element may be distributed among a plurality of elements; a plurality of functions of a plurality of elements may be integrated into on element. In addition, at least a part of the configuration of each embodiment mentioned above may be replaced with a well-known configuration having the same function. In addition, at least a part of the configuration of each embodiment mentioned above may be added to or replaced by the configuration of another embodiment mentioned above.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A communication system configured to connect a plurality of communication apparatuses to communicate with each other via a common transmission line, the system comprising:
a transmitter configured to perform a first conversion of converting every M bits of baseband data into modulation data, the modulation data being one kind of N-bit bit pattern among $2^M$ kinds of N-bit bit patterns according to a value of the every M bits, M being an integer equal to or greater than one, N being greater than M and equal to or greater than three, $2^M$ being the M-th power of 2, the transmitter transmitting the modulation data as transmission data to the transmission line; and
a receiver configured to receive the transmission data via the transmission line, and restore the baseband data from the transmission data by performing a second conversion, that is the reverse of the first conversion, wherein:
the transmitter transmits the transmission data that includes a training pattern, which indicates a bit period of the transmission data, in addition to data corresponding to the baseband data, the transmitter transmitting the data corresponding to the baseband data after the training pattern; and
the receiver specifies the bit period of the transmission data based on the training pattern.

2. The communication system according to claim 1, wherein:
N is an even number; and
the N-bit bit pattern includes "0"s and "1"s, the number of "0"s being equal to the number of "1"s.

3. The communication system according to claim 1, wherein:
M is an integer of one, and $2^M$ is two; and
one of two kinds of N-bit bit patterns has a relation of bit inversion with the other of two kinds of N-bit bit patterns.

4. The communication system according to claim 1, wherein
the $2^M$ kinds of N-bit bit patterns have respective phases that are shifted from each other.

5. The communication system according to claim 4, wherein the $2^M$ kinds of N-bit bit patterns have respective phases that are shifted from each other by K bits, K being an integer equal to or greater than one.

6. The communication system according to claim 4, wherein

M is one, and $2^M$ is two.

7. The communication system according to claim 4, wherein

M is two, and $2^M$ is four.

8. The communication system according to claim 4, wherein

M is three, and $2^M$ is eight.

9. The communication system according to claim 4, wherein:

M is two, and $2^M$ is four;

the baseband data consists of first baseband data and second baseband data;

the first baseband data changes bits at a first time point t1 that is equal to 2T×J+T, T being a period, J being an integer equal to or greater than zero;

the second baseband data changes bits at a second time point t2 that is equal to 2T×J; and the transmitter performs, every the period of T, the first conversion of converting every two bits consisting of one bit of the first baseband data and one bit of the second baseband data into one of four kinds of N-bit bit patterns.

10. The communication system according to claim 1, wherein the $2^M$ kinds of N-bit bit patterns have respective frequencies that are different from each other.

11. The communication system according to claim 1, wherein a first kind of N-bit bit pattern among the $2^M$ kinds of N-bit bit patterns is based on a pseudo random pattern.

12. The communication system according to claim 11, wherein:

the first kind of N-bit bit pattern is an N-bit pseudo random pattern.

13. The communication system according to claim 11, wherein:

the pseudo random pattern is divided equally into I divisional bit patterns from a first divisional bit pattern to an I-th divisional bit pattern, I being an integer equal to or greater than two; the first kind of N-bit bit pattern includes each of the I divisional bit patterns; and when performing the first conversion of converting every M bits, the transmitter uses a Q-th divisional bit pattern to convert the (I×P+Q)-th M bits, P being an integer equal to or greater than zero, Q being greater than zero and not greater than I.

14. The communication system according to claim 11, wherein:

the transmitter divides equally a bit pattern consisting of a plurality of pseudo random patterns into S divisional bit patterns from a first divisional bit pattern to a S-th divisional bit pattern, S being an integer equal to or greater than two; the first kind of N-bit bit pattern includes each of the S divisional bit patterns; and when performing the first conversion of converting every M bits, the transmitter uses a Q-th divisional bit pattern to convert (S×P+Q)-th M bits, P being an integer equal to or greater than zero, Q being greater than zero and not greater than S.

* * * * *